(12) United States Patent
Lin

(10) Patent No.: US 9,411,513 B2
(45) Date of Patent: Aug. 9, 2016

(54) SENSITIVE DATA FILE ATTRIBUTE

(71) Applicant: Kung Y. Lin, Irvine, CA (US)

(72) Inventor: Kung Y. Lin, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 14 days.

(21) Appl. No.: 14/272,877

(22) Filed: May 8, 2014

(65) Prior Publication Data

US 2015/0324130 A1 Nov. 12, 2015

(51) Int. Cl.
*G06F 3/06* (2006.01)
(52) U.S. Cl.
CPC ............... *G06F 3/06* (2013.01); *G06F 3/0608* (2013.01); *G06F 3/0623* (2013.01); *G06F 3/0652* (2013.01); *G06F 3/0676* (2013.01); *G06F 2003/0692* (2013.01)
(58) Field of Classification Search
CPC ... G06F 3/0608; G06F 3/0623; G06F 3/0652; G06F 3/0676
USPC ......................................................... 711/112
See application file for complete search history.

(56) References Cited

U.S. PATENT DOCUMENTS

| 7,668,883 | B2 * | 2/2010 | Tran ...................... G06F 3/0623 707/662 |
| 8,745,011 | B2 * | 6/2014 | Kishi ..................... G06F 11/106 707/692 |
| 9,111,109 | B2 * | 8/2015 | Islam .................. G06F 21/6218 |
| 2002/0078026 | A1 * | 6/2002 | Fergus .................. G06F 3/0622 |
| 2007/0088923 | A1 * | 4/2007 | Armstrong-Crews .. G06F 21/80 711/159 |
| 2008/0065865 | A1 * | 3/2008 | Kim ..................... G06F 12/1027 712/225 |
| 2008/0294848 | A1 * | 11/2008 | Harris ................... G06F 12/084 711/141 |
| 2009/0006787 | A1 * | 1/2009 | De Souza .............. G06F 3/0611 711/156 |
| 2009/0158441 | A1 * | 6/2009 | Mohler ................. G06F 21/552 726/27 |
| 2012/0036582 | A1 * | 2/2012 | Little ................... G06F 12/0261 726/26 |
| 2012/0110238 | A1 * | 5/2012 | Blawat .................... G06F 21/79 711/102 |
| 2012/0278564 | A1 * | 11/2012 | Goss ....................... G06F 12/00 711/155 |
| 2013/0124785 | A1 * | 5/2013 | Xiong .................. G06F 12/0246 711/103 |
| 2013/0291128 | A1 * | 10/2013 | Ito ........................ G06F 21/6254 726/30 |
| 2014/0136576 | A1 * | 5/2014 | Cherel ................. G06F 21/6227 707/813 |
| 2014/0136577 | A1 * | 5/2014 | Cherel ................. G06F 21/6227 707/813 |

\* cited by examiner

*Primary Examiner* — Jared Rutz
*Assistant Examiner* — Jana Blust
(74) *Attorney, Agent, or Firm* — Robert P. Marley

(57) ABSTRACT

Data on a storage device may be marked as sensitive data and this marked sensitive automatically destroyed (e.g., scrubbed) upon erasure. For example, when sensitive data is erased, new data may be immediately written over the erased sensitive data. To destroy the erased data, random characters and/or a fixed sequence of characters may be written over the erased data. The storage device, the operating system, and/or other software may share tasks related to tracking and scrubbing sensitive data. Scrubbing may include writing a fixed sequence, such as zeroes, or writing random characters of data.

20 Claims, 5 Drawing Sheets

SENSITIVE DATA FILE ATTRIBUTE

FIELD OF THE DISCLOSURE

The instant disclosure relates to computer storage. More specifically, this disclosure relates to security of computer storage.

BACKGROUND

Computer systems, and servers in particular, form an information backbone upon which companies now rely on almost exclusively for data storage, data mining, and data processing. These systems are indispensable for the improved efficiency and accuracy at processing data as compared to manual human processing. Furthermore, these systems provide services that could not be realistically accomplished by human processing. For example, some computer systems execute physical simulations in hours that would otherwise take decades to complete by human computations. As another example, some computer systems store terabytes of data and provide instantaneous access to any of the data, which may include records spanning decades of company operations.

Within the large amounts of data, groups may have sensitive information that should remain confidential. One threat to maintaining confidentiality of this sensitive data is during data erasure. Conventionally, data erasure does not destroy the erased data. Rather, the portion of a physical storage device that contained the erased data is marked as available for writing of new data. Not until new data is written over the erased sensitive data is the sensitive data destroyed.

SUMMARY

Data on a storage device may be marked as sensitive data and this marked sensitive automatically destroyed (e.g., scrubbed) upon erasure. For example, when sensitive data is erased, new data may be immediately written over the erased sensitive data. In one embodiment, the data may be files and/or folders in a file system and the files and/or folders may be marked as having sensitive data. In other embodiments, a table of bits may be kept for each data bit, to indicate whether certain data bits contain sensitive data. To destroy the erased data, random characters and/or a fixed sequence of characters may be written over the erased data. In one embodiment, the sensitive data markings may be tracked by an operating system or other software executing in a computer and the operating system or other software may issue write commands to the storage device upon erasure of the data to destroy the data. In another embodiment, the sensitive data markings may be tracked by the storage device and the storage device issue write commands to destroy the erased data. In other embodiments, the storage device and the operating system and/or other software may share tasks related to tracking and destroying sensitive data.

According to one embodiment, a method may include receiving an instruction to delete data from a storage device, wherein the data occupies a portion of the storage device. The method may also include determining whether the data is marked as sensitive data. The method may further include, when the data is marked as sensitive data, scrubbing the portion of the storage device.

According to another embodiment, a computer program product may include a non-transitory computer readable medium comprising code to perform the steps of receiving an instruction to delete data from a storage device, wherein the data occupies a portion of the storage device; determining whether the data is marked as sensitive data; and when the data is marked as sensitive data, scrubbing the portion of the storage device.

According to yet another embodiment, an apparatus may include a memory; and a processor coupled to the memory. The processor may be configured to perform the steps of receiving an instruction to delete data from a storage device, wherein the data occupies a portion of the storage device; determining whether the data is marked as sensitive data; and when the data is marked as sensitive data, scrubbing the portion of the storage device.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
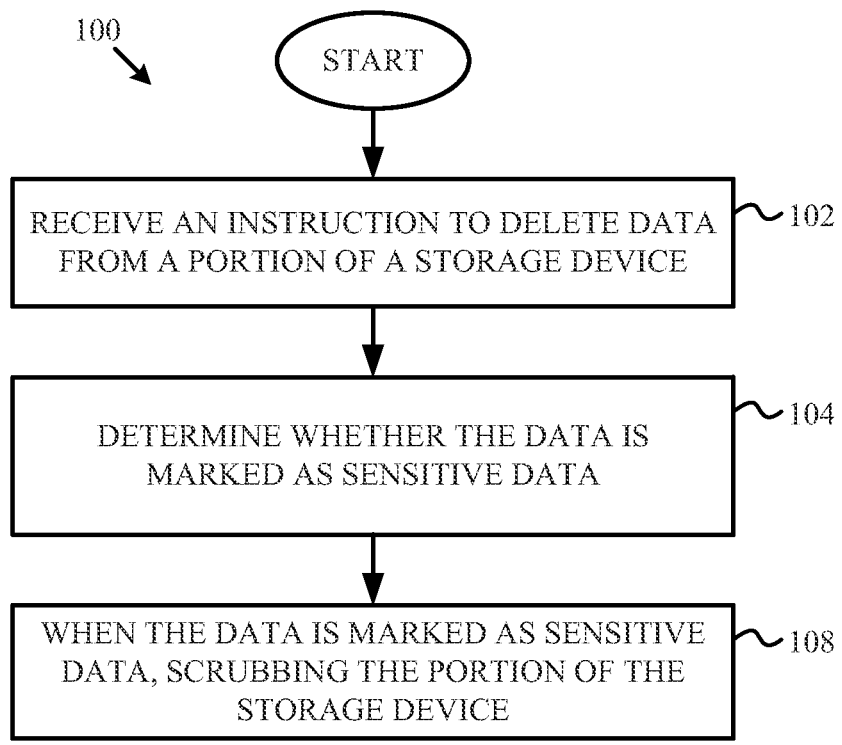
FIG. 1 is a flow chart illustrating a method for scrubbing sensitive data from a storage device when data is deleted according to one embodiment of the disclosure.

FIG. 1 is a flow chart illustrating a method for scrubbing sensitive data from a storage device when data is deleted according to one embodiment of the disclosure. A method 100 for scrubbing data begins at block 102 with receiving an instruction to delete data from a portion of a storage device. The delete instruction may be, for example, a remove, a purge, and/or a close command received by an operating system controlling the storage device. The storage device may be, for example, one or more of a hard disk drive (HDD), tape drive, solid state device (SSD), and/or re-writable optical media, such as DVD-RW or BD-RW.

Figure 2A:
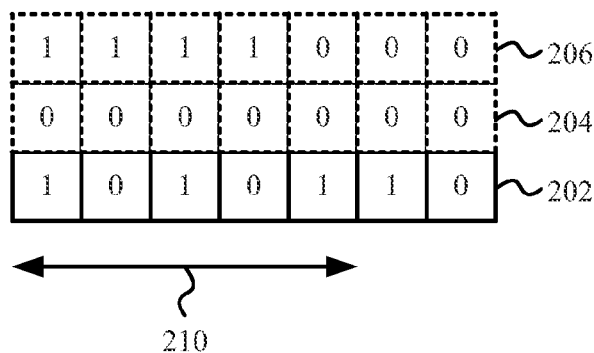
FIGS. 2A-C is a block diagram illustrating an operation of deleting and scrubbing data from a storage device according to one embodiment of the disclosure.

FIG. 2A illustrates data on a storage device before receiving the instruction to delete at block 102. Data 202 may be stored on a storage device and may correspond to one or more files. Use bits 204 may correspond to data bits 202 and indicate whether the data bits 202 are in use. A '0' flag may indicate the corresponding data bits 202 are in use. Alternatively, a '1' flag may indicate that corresponding data bits 202 are in use. Sensitive data flags 206 may be associated with the data bits 202 to indicate whether each bit is sensitive data flagged for scrubbing upon deletion. A '1' flag may indicate that a data bit is set for scrubbing upon deletion. Alternately, a '0' flag may indicate that a data bit is set for scrubbing upon deletion. Although in use bits 204 and sensitive data bits 206 are shown in FIG. 2A, other methods for marking data bits 202 may be used. For example, in use flags 204 may be associated with blocks or other logical units of a storage device, rather than individual bits. In another example, in use flags 204 may be associated with files or folders or other logical units of a data table, such as a file allocation table (FAT), for the storage device.

Figure 2B:
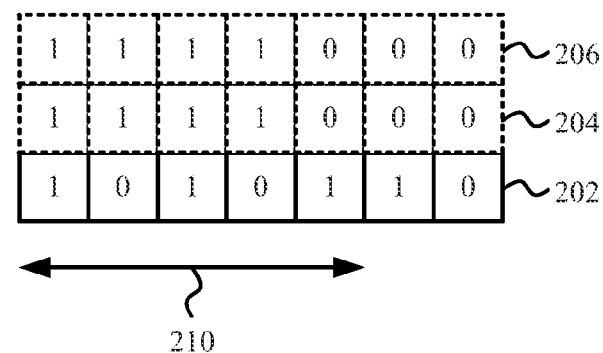

FIG. 2B illustrates data on a storage device after receiving the instruction to delete the data. In use bits 204 corresponding to bits identified for deletion in the received instruction of block 102 in a portion 210 of a storage device are switched from '0' to '1' to indicate the data bits are no longer in use. However, conventionally the data bits are not altered when the data is deleted until new data is written onto the portion 210 of the storage device.

At block 104, it is determined whether the data is marked as sensitive. For example, a flag may be associated with each bit of the data to be deleted. In one embodiment, the data to be deleted at block 102 is a file and a single sensitive data flag is associated with the file. The portion 210 of the storage device has one or more sensitive data flags 206 set for the data bits 202. At block 108, when the data is marked as sensitive data, as in the data bits 202 of the portion 210, the data bits 202 are scrubbed. In one embodiment, scrubbing may be performed by writing binary zeroes to the portion 210, as shown in FIG. 2C.

Figure 2C:
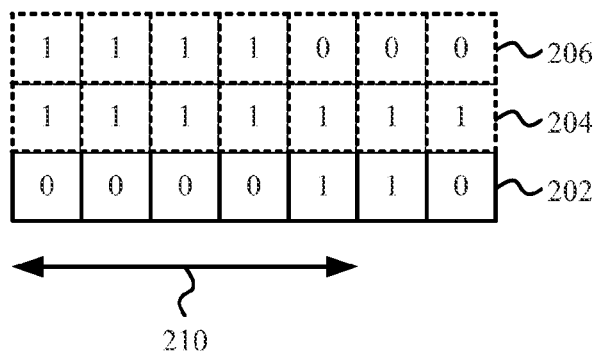

FIG. 2C illustrates data on a storage device after scrubbing. The data bits 202 of the portion 210 have zeroes stored to scrub remnants of data stored in the data bits 202. Because the data bits 202 are scrubbed a user can be confident that the data no longer exists and is no longer accessible.

Figure 3:
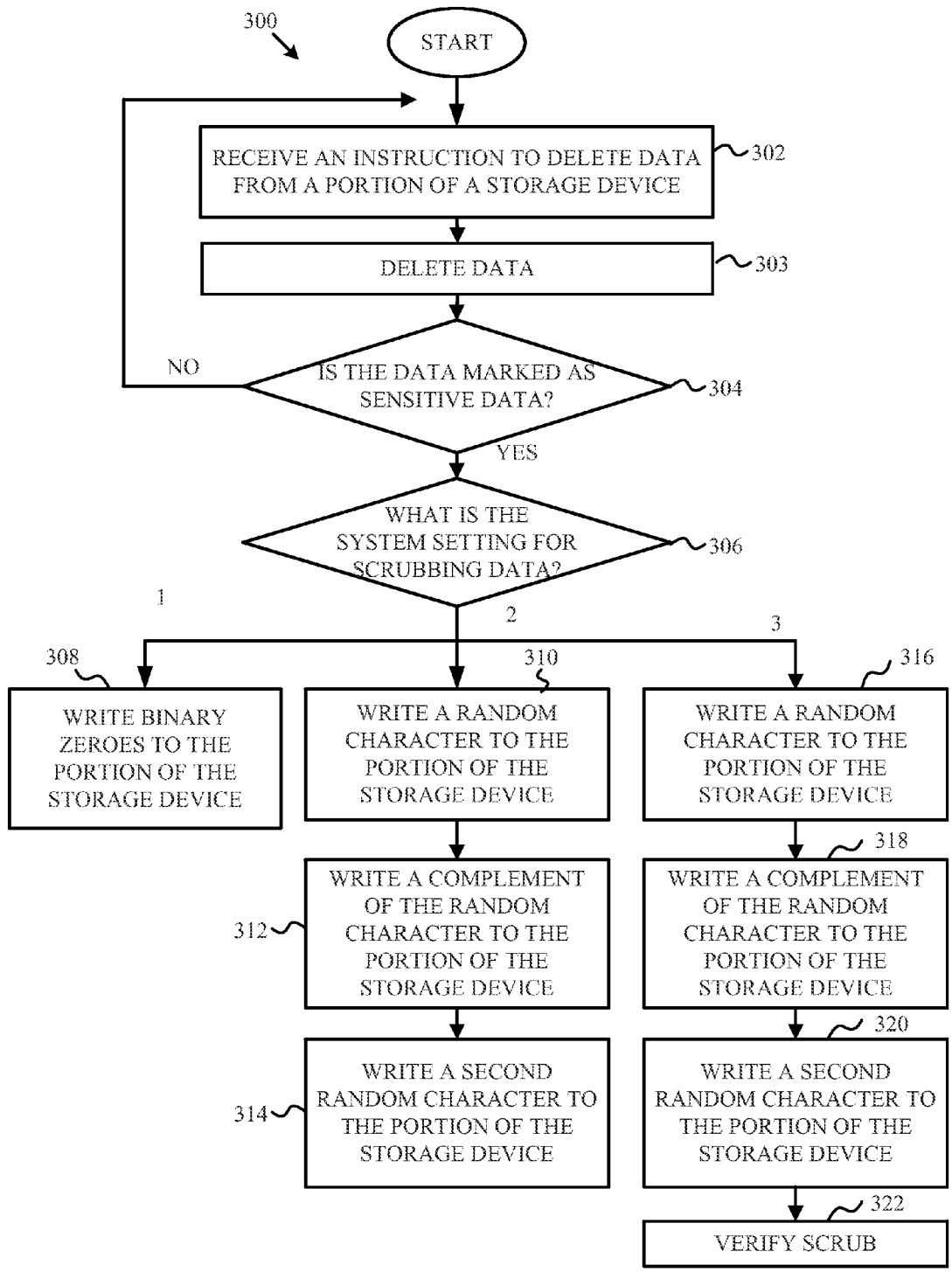
FIG. 3 is a flow chart illustrating a method for scrubbing sensitive data from a storage device when data is deleted according to another embodiment of the disclosure.

Several options may be available for scrubbing data after deleting the data. A user may select one of the several options for scrubbing data. The user's selection may be stored in a system setting and accessed to determine how to scrub data when the data is flagged as sensitive data and deleted. FIG. 3 is a flow chart illustrating a method for scrubbing sensitive data from a storage device when data is deleted according to another embodiment of the disclosure. A method 300 begins at block 302 with receiving an instruction to delete data that occupies a portion of a storage device. At block 303, the data is erased, such as by marking the a portion of the storage device occupied by the erased data as available for storage.

At block 304, it is determined if the data is flagged as sensitive data. If the data is not flagged as sensitive data, the method 300 may return to block 302 for other data to be erased. If the data is flagged as sensitive data, the method 300 may proceed to block 306 to determine a system setting for scrubbing data. In one embodiment, the portion of the storage device corresponding to the erased sensitive data may not be immediately accessible for writing until scrubbing of the portion is carried out. For example, an operating system or the storage device may lock the portion of the storage device corresponding to the erased sensitive data.

A global system setting may specific a method for scrubbing data. Alternatively, a system setting may be set for each sensitive data bit, portion, file, or folder specifying a method for scrubbing data. If the system setting is a first setting at block 306, then the method 300 may proceed to block 308 to write binary zeroes over the erased data to scrub the data. Although a fixed sequence of zeroes is described with reference to block 308, other fixed sequences of characters may be written at block 308. For example, binary ones may be written over the erased data, or a sequence such as characters, such as the English alphabet, may be written over the erased data. If the system setting is a second setting at block 308, then the method 300 may proceed to blocks 310, 312, and 314 to write a random character over the erased data, write a complement of the random character to the erased data, and write a second random character over the erased data, respectively. If the system setting is a second setting at block 308, then the method 300 may proceed to blocks 316, 318, 320, and 322 to write a random character over the erased data, write a complement of the random character to the erased data, write a second random character over the erased data, and verify the scrubbing, respectively. The scrubbing of data may be verified at block 322 by, for example, reading the portion of the storage device corresponding to the erased data and determining whether the read data from the portion corresponds to the second random character written at block 320. In one embodiment, if the data is not verified at block 322 then the method 300 may return to block 308, 310, or 316 to begin a new scrubbing process.

Figure 4:
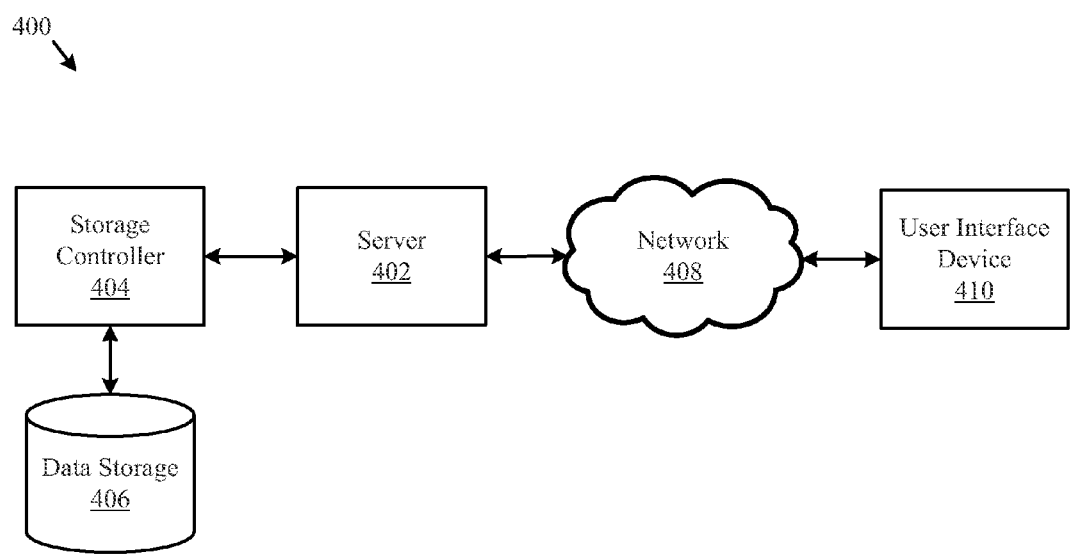
FIG. 4 is a block diagram illustrating a computer network according to one embodiment of the disclosure.

FIG. 4 illustrates one embodiment of a system 400 for an information system, including a system for scrubbing sensitive data. The system 400 may include a server 402, a data storage device 406, a network 408, and a user interface device 410. In a further embodiment, the system 400 may include a storage controller 404, or storage server configured to manage data communications between the data storage device 406 and the server 402 or other components in communication with the network 408. In an alternative embodiment, the storage controller 404 may be coupled to the network 408.

In one embodiment, the user interface device 410 is referred to broadly and is intended to encompass a suitable processor-based device such as a desktop computer, a laptop computer, a personal digital assistant (PDA) or tablet computer, a smartphone, or other mobile communication device having access to the network 408. In a further embodiment, the user interface device 410 may access the Internet or other wide area or local area network to access a web application or web service hosted by the server 402 and may provide a user interface for controlling sensitive data on a storage device.

The network 408 may facilitate communications of data between the server 402 and the user interface device 410. The network 408 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 5:
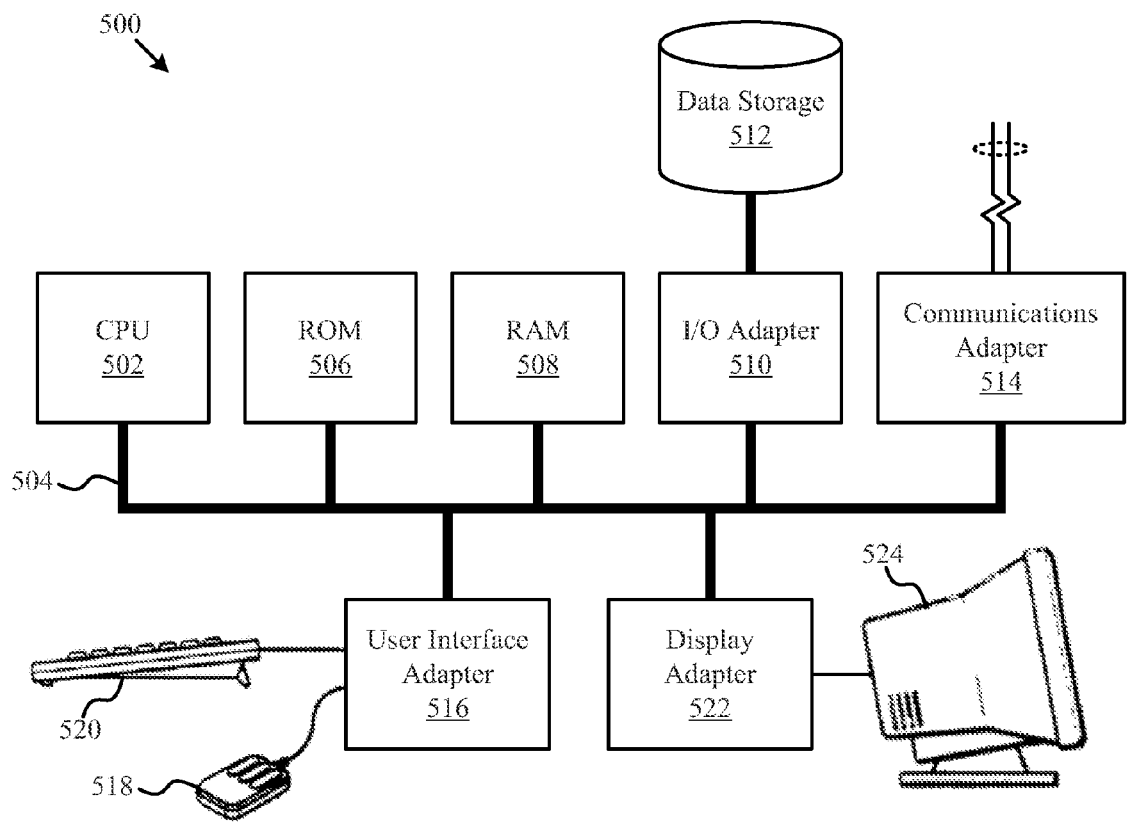
FIG. 5 is a block diagram illustrating a computer system according to one embodiment of the disclosure.

FIG. 5 illustrates a computer system 500 adapted according to certain embodiments of the server 402 and/or the user interface device 410. The central processing unit ("CPU") 502 is coupled to the system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the operations as described herein. The CPU 502 may execute the various logical instructions according to the present embodiments.

The computer system 500 may also include random access memory (RAM) 508, which may be synchronous RAM (SRAM), dynamic RAM (DRAM), synchronous dynamic RAM (SDRAM), or the like. The computer system 500 may utilize RAM 508 to store the various data structures used by a software application. The computer system 500 may also include read only memory (ROM) 506 which may be PROM, EPROM, EEPROM, optical storage, or the like. The ROM may store configuration information for booting the computer system 500. The RAM 508 and the ROM 506 hold user and system data, and both the RAM 508 and the ROM 506 may be randomly accessed.

The computer system 500 may also include an input/output (I/O) adapter 510, a communications adapter 514, a user interface adapter 516, and a display adapter 522. The I/O adapter 510 and/or the user interface adapter 516 may, in certain embodiments, enable a user to interact with the computer system 500. In a further embodiment, the display adapter 522 may display a graphical user interface (GUI) associated with a software or web-based application on a display device 524, such as a monitor or touch screen.

The I/O adapter 510 may couple one or more storage devices 512, such as one or more of a hard drive, a solid state storage device, a flash drive, a compact disc (CD) drive, a floppy disk drive, and a tape drive, to the computer system 500. According to one embodiment, the data storage 512 may be a separate server coupled to the computer system 500 through a network connection to the I/O adapter 510. The communications adapter 514 may be adapted to couple the computer system 500 to the network 408, which may be one or more of a LAN, WAN, and/or the Internet. The user interface adapter 516 couples user input devices, such as a keyboard 520, a pointing device 518, and/or a touch screen (not shown) to the computer system 500. The keyboard 520 may be an on-screen keyboard displayed on a touch panel. The display adapter 522 may be driven by the CPU 502 to control the display on the display device 524. Any of the devices 502-522 may be physical and/or logical.

The applications of the present disclosure are not limited to the architecture of computer system 500. Rather the computer system 500 is provided as an example of one type of computing device that may be adapted to perform the functions of the server 402 and/or the user interface device 410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 600 may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above. For example, the method of FIGURE described above may be executed by a processor and memory integrated with and coupled to a hard disk drive (HDD) platter storage device in the data storage 406 and/or the storage controller 404 described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   receiving an instruction to delete data from a storage device, wherein the data occupies a portion of the storage device;
   changing use bits that correspond to the data from in-use status to not-in-use status, wherein one use bit corresponds to one data bit;
   determining whether the data is marked as sensitive data in sensitive data bits, wherein one sensitive data bit corresponds to one data bit; and
   when the data is marked as sensitive data, scrubbing the portion of the storage device.

2. The method of claim 1, further comprising preventing access to the portion of the storage device until after the portion is scrubbed.

3. The method of claim 1, further comprising, when the data is marked as sensitive data, determining a scrubbing method for scrubbing the portion of the storage device.

4. The method of claim 1, wherein the step of scrubbing the portion comprises writing binary zeroes to the portion of the storage device.

5. The method of claim 1, wherein the step of scrubbing the portion comprises:
   during a first pass, writing a random character to the portion of the storage device;
   during a second pass, writing a complement of the random character to the portion of the storage device; and during a third pass, writing a second random character to the portion of the storage device.

6. The method of claim 5, further comprising during a fourth pass, reading the portion of the storage device to verify the second random character is stored in the portion of the storage device.

7. The method of claim 1, wherein the data comprises a file and a wherein the storage device comprises a disk drive.

8. A computer program product, comprising:
  a non-transitory computer readable medium comprising code to perform the steps of:
    receiving an instruction to delete data from a storage device, wherein the data occupies a portion of the storage device;
    changing use bits that correspond to the data from in-use status to not-in-use status, wherein one use bit corresponds to one data bit;
    determining whether the data is marked as sensitive data in sensitive data bits, wherein one sensitive data bit corresponds to one data bit; and
    when the data is marked as sensitive data, scrubbing the portion of the storage device.

9. The computer program product of claim 8, wherein the medium further comprises code to perform the step of preventing access to the portion of the storage device until after the portion is scrubbed.

10. The computer program product of claim 8, wherein the medium further comprises code to perform the step of, when the data is marked as sensitive data, determining a scrubbing method for scrubbing the portion of the storage device.

11. The computer program product of claim 8, wherein the step of scrubbing the portion comprises writing binary zeroes to the portion of the storage device.

12. The computer program product of claim 8, wherein the step of scrubbing the portion comprises:
  during a first pass, writing a random character to the portion of the storage device;
  during a second pass, writing a complement of the random character to the portion of the storage device; and
  during a third pass, writing a second random character to the portion of the storage device.

13. The computer program product of claim 12, wherein the medium further comprises code to perform the step of, during a fourth pass, reading the portion of the storage device to verify the second random character is stored in the portion of the storage device.

14. The computer program product of claim 8, wherein the data comprises a file and a wherein the storage device comprises a disk drive.

15. An apparatus, comprising:
  a memory;
  a storage device; and
  a processor coupled to the memory and the storage device, wherein the processor is configured to execute the steps of:
    receiving an instruction to delete data from the storage device, wherein the data occupies a portion of the storage device;
    changing use bits that correspond to the data from in-use status to not-in-use status, wherein one use bit corresponds to one data bit;
    determining whether the data is marked as sensitive data in sensitive data bits, wherein one sensitive data bit corresponds to one data bit; and
    when the data is marked as sensitive data, scrubbing the portion of the storage device.

16. The apparatus of claim 15, wherein the processor is further configured to perform the step of preventing access to the portion of the storage device until after the portion is scrubbed.

17. The apparatus of claim 15, wherein the processor is further configured to perform the step of, when the data is marked as sensitive data, determining a scrubbing method for scrubbing the portion of the storage device.

18. The apparatus of claim 15, wherein the step of scrubbing the portion comprises writing binary zeroes to the portion of the storage device.

19. The apparatus of claim 15, wherein the step of scrubbing the portion comprises:
  during a first pass, writing a random character to the portion of the storage device;
  during a second pass, writing a complement of the random character to the portion of the storage device; and
  during a third pass, writing a second random character to the portion of the storage device.

20. The apparatus of claim 19, wherein the processor is further configured to perform the step of, during a fourth pass, reading the portion of the storage device to verify the second random character is stored in the portion of the storage device.

* * * * *